(12) United States Patent
Hollon

(10) Patent No.: US 7,271,726 B2
(45) Date of Patent: Sep. 18, 2007

(54) RFID TAG-PALLET

(75) Inventor: Dale Hollon, Orlando, FL (US)

(73) Assignee: CHEP Technology Pty Limited, Sydney (AU)

( * ) Notice: Subject to any disclaimer, the term of this patent is extended or adjusted under 35 U.S.C. 154(b) by 229 days.

(21) Appl. No.: 10/701,745

(22) Filed: Nov. 4, 2003

(65) Prior Publication Data
US 2005/0093701 A1    May 5, 2005

(51) Int. Cl.
*G08B 13/14* (2006.01)

(52) U.S. Cl. .................. 340/572.7; 340/572.8

(58) Field of Classification Search ............ 340/572.1, 340/572.4, 572.7, 572.8, 568.8, 5.61, 10.1, 340/10.3; 343/700 MS, 829, 818; 194/209; 257/673, 674; 342/357.07
See application file for complete search history.

(56) References Cited

U.S. PATENT DOCUMENTS

| | | | |
|---|---|---|---|
| 5,685,234 A | 11/1997 | Grigsby et al. | |
| 5,786,626 A | 7/1998 | Brady et al. | |
| 5,908,135 A | 6/1999 | Bradford et al. | |
| 5,947,256 A * | 9/1999 | Patterson | 194/209 |
| 6,107,920 A | 8/2000 | Eberhardt et al. | |
| 6,166,637 A * | 12/2000 | Cyr et al. | 340/572.7 |
| 6,278,413 B1 * | 8/2001 | Hugh et al. | 343/818 |
| 6,366,260 B1 | 4/2002 | Carrender | |
| 6,407,669 B1 | 6/2002 | Brown et al. | |
| 6,441,740 B1 * | 8/2002 | Brady et al. | 340/572.7 |
| 6,483,434 B1 | 11/2002 | UmiKer | |
| 6,542,114 B1 * | 4/2003 | Eagleson et al. | 342/357.07 |
| 6,549,064 B2 | 4/2003 | Bandy et al. | |
| 6,554,188 B1 * | 4/2003 | Johnson et al. | 235/385 |
| 6,563,463 B1 * | 5/2003 | Saito | 343/700 MS |
| 6,600,418 B2 | 7/2003 | Francis et al. | |
| 6,621,410 B1 | 9/2003 | Lastinger et al. | |
| 6,714,121 B1 * | 3/2004 | Moore | 340/10.3 |
| 6,809,703 B2 | 10/2004 | Serra | |
| 6,814,284 B2 | 11/2004 | Ehlers et al. | |
| 6,998,983 B2 | 2/2006 | Charych et al. | 340/572.8 |
| 7,019,650 B2 * | 3/2006 | Volpi et al. | 340/572.1 |
| 7,075,435 B2 | 7/2006 | Jesser | 340/572.1 |
| 7,084,740 B2 | 8/2006 | Bridgelall | 340/10.43 |
| 2002/0030597 A1 | 3/2002 | Muirhead | |
| 2002/0067267 A1 | 6/2002 | Kirkham | |

FOREIGN PATENT DOCUMENTS

JP     2002-321725     11/2002

* cited by examiner

*Primary Examiner*—Van T. Trieu
(74) *Attorney, Agent, or Firm*—Allen, Dyer, Doppelt, Milbrath & Gilchrist, P.A.

(57) ABSTRACT

A radio frequency identification (RFID) tag and systems and methods of using an RFID tag. The RFID tag is a multi-planar tag that may be incorporated with an object, such as a container or pallet. The tag and/or the tag/object combination may then be used in a method to track the location of the object. The multi-planar tag permits an object to be more easily tracked and increases the reliability of the tracking method.

24 Claims, 4 Drawing Sheets

RFID TAG-PALLET

FIELD OF THE INVENTION

The present invention is directed to radio frequency identification (RFID) tags and systems and methods of using these tags.

BACKGROUND OF THE INVENTION

To achieve highly efficient inventory and transport operations, it is beneficial to accurately track the movements of pallet loads, containers and other objects to be located and/or transferred as they are transported to and from various locations. In a worldwide inventory and transport business, a container, pallet of other object may, at any given time, be located at a manufacturer, in a warehouse, on a truck or ship, or may already be delivered to the final destination. In a worldwide system, the goods to be transported are picked up from one location, transported via truck, train and/or ship and then delivered. Due to the extremely high volume of containers, pallets or other objects, shipped everyday, it is difficult to keep track of these objects.

Additionally, once goods have been delivered to a particular destination, such as a warehouse, the goods may be located at various locations in the warehouse, such as storage locations, stocking locations, staging areas, and loading docks. In typical inventory and transport operations, the operator of a transport vehicle, such as a fork truck, reach truck, lift truck or pallet truck, receives a set of printed stocking or picking orders, typically generated by a computer, and executes the orders by visually identifying the loads and locations and transporting the loads to and from the locations specified on the orders. In such a system, especially in large-scale warehouses with a large number of locations and loads to handle, there are numerous opportunities for errors.

Some warehouse management operations use bar codes that are affixed to the loads or that mark specific locations. In a typical example of such a system, the operator uses a hand-held bar code scanner to read the bar code on the loads and, in some cases, on the stock locations. Although such a system is an improvement over purely visual processes, it may be difficult to completely implement, due partly to the need for direct line of sight, close proximity, and proper alignment between the scanner and barcodes. It also requires the operator to participate in the load-identification process. In some case, the operator may need to exit the transport vehicle to scan the barcodes manually, slowing down warehouse operations. Certain locations, for example high storage shelves and loading docks, often are particularly difficult places for using bar codes because of the need for close proximity between the codes and the reader. As a result, loads in those areas are often visually identified instead.

Radio Frequency Identification (RFID) transponders (tags) have been proposed as an alternative to bar codes. RFID tags are operated in conjunction with RFID base stations for a variety of inventory-control, security and other purposes. Typically an item having a tag associated with it, for example, a container with a tag placed inside it, is brought into a "read zone" established by the base station. The RFID base station transmits an interrogating RF signal that is modulated by a receiving tag. That is, the RFID base station generates a continuous wave electromagnetic disturbance at a carrier frequency and this disturbance is modulated to correspond to data that is to be communicated via the disturbance. The modulated disturbance, or signal, communicates the information at a rate, referred to as the data rate, that is lower than the carrier frequency. The receiving tag modulates the RF signal in order to impart to the signal information stored within the tag and then transmits the modulated, answering, RF signal to the base station.

In a typical conventional system, RFID tags containing information associated with the identities of inventory items to be tracked are attached to the inventory items. An RFID interrogator is used to detect the presence of an RFID tag and read the identification information from the tag. A typical RFID interrogator includes an RF transceiver for transmitting interrogation signals to and receiving response signals from RFID tags, one or more antennae connected to the transceiver, and associated decoders and encoders for reading and writing the encoded information in the received and transmitted RF signals, respectively. The interrogator may be a portable device, that may be brought near the tags to be read, or it may be a stationary device, that reads the tags as they are brought to the interrogator, as in the case of tagged library books being returned to a return station that is fitted with an interrogator. RFID tags may also be affixed near a location as a location marker. After detecting both a tag attached to an inventory item and a location marking tag, a processing unit associated with the interrogator may determine that the inventory item is positioned near the tagged location. While these conventional object tracking systems are capable of keeping a record of the inventory items and sometimes their locations, they are not effective for tracking and/or managing the movement of the inventory items.

There also exist warehouse inventory tracking systems that include fixed RFID interrogators at various locations to detect RFID-tagged items when they are positioned near the interrogator-equipped locations. For example, there are warehouses with RFID interrogators positioned at or near the loading dock gates. Such systems are capable of tracking the arrival of tagged items at the various locations, but are not capable of detecting errors remote to these locations. For example, if a fork truck picked up a wrong load because the truck was driven to a wrong pick-up location, the error would not be detected until the load had reached the gate. This delayed error detection negatively impacts the overall efficiency of warehouse operations. Additionally, outfitting each of the numerous loading dock gates with an interrogator is not cost effective.

RFID tags are categorized as either active or passive. Active RFID tags are powered by an internal battery and are typically read/write, i.e., tag data may be rewritten and/or modified. An active tag's memory size varies according to application requirements. The battery-supplied power of an active tag generally gives it a longer read range. The trade off is greater size, greater cost, and a limited operational life (that may yield a maximum of 10 years, depending upon operating temperatures and battery type).

Passive RFID tags operate without a separate external power source and obtain operating power generated from the reader. Passive tags are consequently much lighter than active tags, less expensive, and offer a virtually unlimited operational lifetime. Read-only tags are typically passive and are programmed with a unique set of data (usually 32 to 128 bits) that cannot be modified.

Read-only tags most often operate as a license plate into a database, in the same way as linear barcodes reference a database containing modifiable product-specific information. And, because they do not include a battery, "read-only" passive tags are typically much more "environmentally-friendly".

Although field-powered passive tag RFID systems provide cost, reliability, and environmental benefits, there are obstacles to the efficient operation of field-powered passive tag RFID systems. In particular, it is often difficult to deliver sufficient power from a base station to a field-powered passive tag via an interrogating signal. The amount of power a base station may impart to a signal is limited by a number of factors, not the least of which is regulation by the Federal Communication Commission (FCC). An RFID tag may employ a resonant antenna in order to best utilize the signal power available to it. Unfortunately, a resonant antenna may require a good deal more area than is available to an RFID tag in many applications.

Additionally, one of the primary advantages of all types of RFID systems is the non-contact, non-line-of-sight nature of the technology. Tags may be read through a variety of substances such as snow, fog, ice, paint, crusted grime, and other visually and environmentally challenging conditions, where barcodes or other optically read technologies would be useless. RFID tags may also be read in challenging circumstances at remarkable speeds, in most cases responding in less than 100 milliseconds. However, even though line-of-sight is not required, in instances where the tag is blocked by other containers and/or wherein the non-line-of-sight is used to read the tag, the range of the tags is reduced, thereby reducing the effectiveness of the tags and leading to situations wherein a container or series of containers may become "lost" during transport.

Therefore, it would be beneficial to provide a system that provides increased accuracy to the process of object identification, movement and tracking throughout a transport, inventory, or other similar operation. There is a need for such a system that is adaptable for use with all of the wide variety of locations that are involved in inventory and transport operations, such as stocking locations, storage racks, floor lanes, warehouses, trucks, ships, and shipping docks.

The present invention is directed to alleviating one or more of the aforementioned problems, and meeting one or more of the above-identified needs.

SUMMARY OF THE INVENTION

The present invention provides a system that has increased accuracy and reliability in the method of object identification, movement and tracking throughout a transport, inventory, or other similar operation. The present invention accomplishes this by using a multi-planar RFID tag. Objects that have the multi-planar RFID tag attached thereto are easier to identify and track due to the increased responsiveness of the multi-planar RFID tag. As a result, methods of tracking these objects are more accurate and reliable.

In particular, one embodiment of the present invention provides a multi-planar radio frequency identification tag including an antenna, a semiconductor chip in electrical communication with the antenna, and a substrate for holding the antenna and the chip. The multi-planar radio frequency identification tag is bent at a location of the tag to form a first portion of the tag that occupies a first plane and a second portion of the tag that occupies a second plane.

Another embodiment of the present invention provides an object capable of being tracked including an object, and a multi-planar radio frequency identification tag attached to the object. The multi-planar radio frequency identification tag includes an antenna, a semiconductor chip in electrical communication with the antenna, and a substrate for holding the antenna and the chip. The multi-planar radio frequency identification tag is bent at a location of the tag to form a first portion of the tag that occupies a first plane and a second portion of the tag that occupies a second plane.

Yet another embodiment of the present invention provides a method of tracking an object including the steps of attaching at least one radio frequency identification tag to the object, using a first radio frequency identification interrogator located in a first location to scan the tag attached to the object and transmit data regarding the object to a data storage site, using a second radio frequency identification interrogator located in a second location to scan the tag attached to the object and transmit data regarding the object to the data storage site, and tracking the object using the data scanned by the first radio frequency identification interrogator and the second radio frequency identification interrogator.

DETAILED DESCRIPTION OF THE DRAWINGS

Other objects, features and advantages of the will become apparent upon reading the following detailed description, while referring to the attached drawings, in which.

DETAILED DESCRIPTION OF THE INVENTION

The present invention is more particularly described in the following description that is intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

The object of any RFID system is to carry data in suitable transponders, generally known as tags, and to retrieve data, by machine-readable means, at a suitable time and place to satisfy particular application needs. Data within a tag may provide identification for an item in manufacture, goods in transit, a location, the identity of a vehicle, an animal or individual.

Communication of data between tags and a reader is by wireless communication. Two methods distinguish and categorize RFID systems, one based upon close proximity electromagnetic or inductive coupling and one based upon propagating electromagnetic waves. Coupling is via 'antenna' structures forming an integral feature in both tags and readers. While the term antenna is generally considered more appropriate for propagating systems it is also loosely applied to inductive systems.

Transmitting data is subject to the vagaries and influences of the media or channels through which the data has to pass, including the air interface. Noise, interference and distortion are sources of data corruption that arise in practical communication channels that must be guarded against in seeking to achieve error free data recovery. By increasing the accuracy of data recovery, methods of tracking and transporting inventory become more efficient and customers, suppliers and the like are better able to manage their operations.

As such, the present invention provides a beneficial multi-planar RFID tag, a container including the multi-planar RFID tag, and a method of tracking objects using a multi-planar RFID tag. By occupying more than one plane, the RFID tag of the present invention is less susceptible to interference during data transmission and, therefore, improves known systems and methods for tracking and transporting objects using RFID tags.

In a first embodiment, the present invention provides a multi-planar RFID tag. As used herein, the term "multi-planar" is used to indicate that the RFID tag is constructed and arranged to occupy more than one plane of the object. In one embodiment, the tag has a two portions, wherein the second portion is perpendicular to the first portion. In this embodiment, the first portion occupies one plane while the second portion occupies a second plan oriented at 90° to the first plane, thereby resulting in a multi-planar tag. In those embodiments where the tag is placed on an object having a curvilinear shape, the tag occupies a plurality of planes as defined by the tangents of various points along the arc formed by placing the RFID tag on the object having a circular shape. By using a multi-planar tag, the present invention maximizes antenna area on different sides of the object, such that, regardless of the tag's orientation or the orientation of the object in relation to the reader, the tag is better able to receive and transmit a signal. In the embodiments that utilize passive tags, the signal may be stronger as more energy is absorbed by the tag that may then be used to emit a stronger response signal, thereby increasing the distance at which the reader must be located to read the tag. By orienting the antenna of the RFID tag in different planes, the present invention increases the opportunity for the tag to receive incoming signals. As radio frequencies are relatively straight line signals, there is a greater likelihood of having a signal missed if the antenna occupies only one plane of the tag.

Generally speaking, RFID tags are low power integrated circuits suitable for interfacing to external coils, or utilizing "coil-on-chip" technology, for data transfer and/or power generation. RFID tags may be designed depending on one or more of the following options: means by which the tag is powered, data carrying options, data read rates, programming options, and their physical form.

The present invention includes embodiments wherein the tags may be either passive or active, the designation being determined entirely by the manner in which the device derives its power. Active tags are powered by an internal battery. As such, in those embodiments using an active tag, the tag will usually contain a cell that exhibits a high power-to-weight ratio and are usually capable of operating over a large temperature range. The use of a battery indicates that the RFID tag has a finite lifetime. However in some embodiments, the tags may run as long as ten or more years. In other embodiments, passive tags are used. Passive tags operate without an internal battery source, deriving the power to operate from the field generated by the reader. Passive tags are, therefore, lighter than active tags, less expensive, and offer a virtually unlimited operational lifetime. Passive tags are constrained in their capacity to store data and the ability to perform well in electromagnetically noisy environments. Sensitivity and orientation performance may also be constrained by the limitation on available power. Despite these limitations passive transponders offer advantages in terms of cost and longevity. They have an almost indefinite lifetime and are generally lower on price than active transponders. Accordingly, the selection of either a passive tag or an active tag in the present invention will be dependent on one or more of the design features described above. The present invention contemplates that the multi-planar RFID tag is a passive tag. However, in some embodiments, the multi-planar RFID tag may include its own power source.

The multi-planar RFID tags of the present invention are not limited to any specific size or shape. In general, the tag includes a semiconductor chip having RF circuits, logic, and memory. The tag also has an antenna and a substrate for mounting the components. The tag may include interconnections between components or the interconnections may be obviated based upon the method of manufacturing the tag. The tag may also be enclosed in a physical enclosure. In general, RFID tags are manufactured by mounting the individual elements to a circuit card. This mounting is accomplished by using either short wire bond connections or soldered connections between the board and one or more of the circuit elements: the data storage device, capacitors, diodes, antenna. The circuit card may be formed of any suitable material, such as epoxy-fiberglass composition or ceramic. The circuit card may be attached or enclosed within the substrate.

The substrate may be manufactured from any suitable material or materials. Suitable materials for the substrate may provide beneficial characteristics. For example, the substrate may be non-conductive between the various components of the circuit pattern to prevent shorting between them. It is beneficial that the substrate and at least a portion of the circuit pattern be flexible such that portions of the substrate may be folded or creased without severing any required electrical connections and/or fracturing the substrate. Examples of materials that may be used to form the substrate include, but are not limited to, paper, cardboard, ethylene acetate, polystyrene, polycarbonate, polypropylene, polyethylene, polyurethane, polyester, polyolefin, polyamide, vinyl, silicones, rubber based adhesives, acrylic adhesive, water soluble adhesives, polyethylene terephthalate (PET), polyethylene naphthalate (PEN), polyetherimide (PEI), polyetheretherketone (PEEK), polysulfone (PS), polyphenylene sulfone (PPS), and polyethersulphone (PES), polyvinyl chloride (PVC), polyester (MYLAR®), polyimide (KAPTON®), and combinations thereof. Furthermore, the substrate may be a homogeneous structure or the substrate may be constructed of two or more different materials provided as different layers or otherwise.

The data storage device is typically a microchip that includes information regarding the object tagged. The size and data storage capacity of the microchip will vary depending on what information is to be stored. This information may include, but is not limited to, identification information, delivery and/or pick-up location, time and date information, serial numbers, package content, key process instructions, and combinations thereof.

The circuit pattern of the multi-planar RFID tag may be made using a variety of techniques for forming electrically conductive patterns. The circuit pattern may, for example, be formed using standard printed circuit methods, wherein an original stencil pattern is screen printed with an etch resistant ink onto a metal layer, and the non-ink coated portions are subsequently etched away. Other techniques suitable for providing electrically conductive patterns may similarly be utilized, such as metal foil patterned by photo-resist/etch techniques, laser ablation, etc. Another suitable technique may, for example, involve stenciling or printing of conductive ink onto the substrate. In still other techniques, the circuit pattern may be built up by pattern-wise plating onto, e.g., a metal foil, seed layer, conductive ink layer, etc.

The circuit pattern of the RFID tag includes an antenna. The antenna is used to receive and transmit a signal from the RFID tag to the reader or interrogator. Also, in the use of passive tags, the antenna may be used in conjunction with the circuit and/or a charge pump, to convert a portion of the frequency into energy to enable the tag to emit a response signal. The antenna may include loops of wire soldered to the circuit card or may comprise metal etched or plated on a circuit card. The antenna may also comprise a leadframe antenna. A leadframe antenna is generally made from a material that is electrically conductive and has a degree of stiffness that permits the antenna to flex within a given amount when supported at one or more ends. A leadframe antenna is generally a punched and/or etched foil. The materials that may be used in an antenna include, but are not limited to, copper, copper-alloys, or nickel-iron alloys such as alloy-42.

However, in select embodiments, the antenna is a dipole antenna or a double dipole antenna. As discussed in further detail in FIG. 3, below, a dipole antenna is an antenna that includes two small antenna that are connected to the chip at two connections. One of the connections is the active dipole and the other connection is the reflective dipole. As a result, the antenna, when the RFID tag is bent, has substantially all of one antenna in the first portion and substantially all of the second antenna in the second portion, thereby ensuring the increased reception and signal strength resulting from using the RFID tag of the present invention. In other select embodiments, the antenna is a double dipole antenna. As discussed in further detail in FIG. 4, below, a double dipole antenna has two sets of active dipoles and two sets of reflective dipoles. By arranging the dipoles on the RFID tag of the present invention, each of the first and second portions of the multi-planar tag may include an antenna attached to an active dipole and an antenna attached to a reflective dipole, thereby ensuring the increased reception and signal strength resulting from using the multi-planar RFID tag of the present invention.

The tag is constructed and arranged as a tag that is bent and which, as a result of the bend, may form a fold or crease. In other embodiments, the bend results in a tag having an arc or crescent shape. The bend in the RFID tag creates a tag having a first portion and a second portion, wherein the two portions are angularly oriented to form an orientation angle. As used herein, the term "orientation angle" refers to the angle defined by the second portion of the RFID tag in relation to the first portion of the RFID tag. An orientation angle of 90° would indicate that the second portion and first portion formed a right angle or, in other terms, the second portion was perpendicular to the first portion. Since the RFID tag is multi-planar and may be used on any shape of object, the orientation angle may range from about 45° to about 135°, depending on the shape of the object to which the multi-planar tag is attached. However, it is also to be understood that the orientation angle may be less than 45° (but greater than 0°) or greater than 135° (but less than 180°) if the shape of the object so requires. In those embodiments where the bend forms a tag having a crescent-shape, the orientation angle would be the angle formed by the intersection of the tangents of the end points of the tag. Lastly, it is also contemplated that the multi-planar RFID tag of the present invention may be designed such that the tag has multiple bends, thereby resulting in a multi-planar tag having more than two portions. For example, if the object to be tracked had an equilateral triangle cross-section and the tag were placed on the end of the object, the tag may have three portions, wherein a first portion of the tag is positioned on the end of the object while the second portion and the third portion would be positioned on two of the three sides of the object.

As discussed, the bend results in a first portion and a second portion. The data storage device, such as a microprocessor, is located in one of these portions, as well as part of the antenna. The other portion includes the other part of the antenna. The bend in the RFID tag is beneficially formed in the tag to maximize antenna area in the non-data storage device portion of the tag. As a result, in selected embodiments, the bend is placed as close as possible to the data storage device without placing to much stress on the data storage device itself. The bend should not be on the data storage device itself as the bend will likely damage the data storage device and/or the data storage device-to-inlay joint. However, it is contemplated that, in some embodiments and depending on the size of the tag, the size of the orientation angle, the materials comprising the tag, and/or the construction of the data storage device, it may be possible to bend the RFID tag over the data storage device or close to the data storage device as long as the data storage device is not damaged by the bend. In one embodiment of the present invention, the bend is located from about 5 mm to about 10 mm away from the location of the data storage device.

The size of the tag is not critical. In general, the size of the tag will be large enough to accommodate the chip and the antenna, while also being capable of being bent to form a multi-planar tag. The thickness of the tag is also not critical, again such that the tag is capable of being bent. In one embodiment of the present invention, the tag has a thickness of from about 0.1 mm to about 2.0 mm. In another embodiment, the tag has a thickness of from about 0.3 mm to about 1.2 mm.

Figure 1:
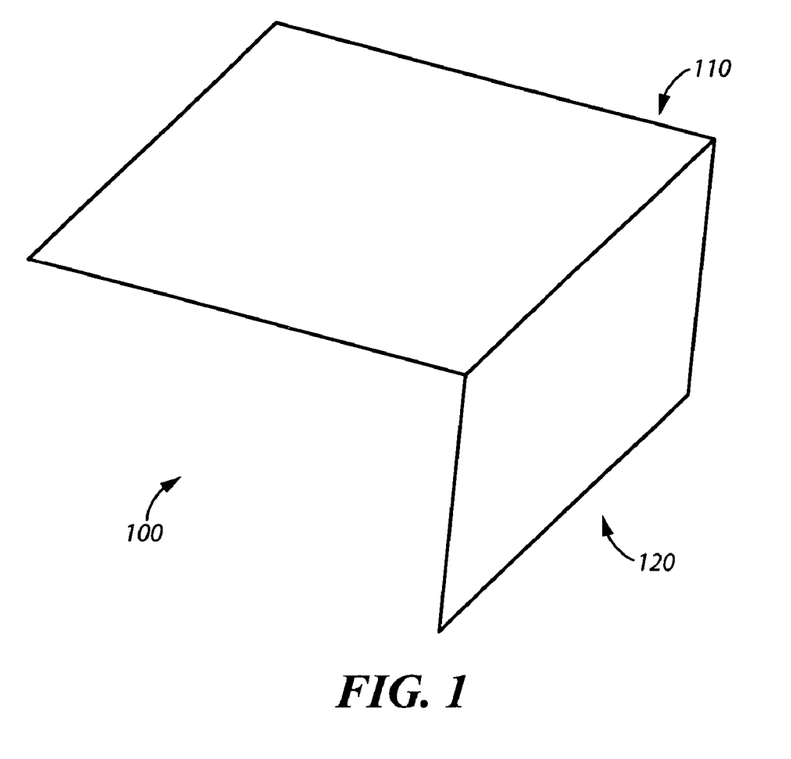
FIG. 1 is a perspective view of a multi-planar RFID tag according to one embodiment of the present invention.

Reference is now made with specific detail to the drawings in which like reference numerals designate like or equivalent elements throughout the several views, and initially to FIG. 1. In one embodiment of the present invention, the present invention provides a multi-planar RFID tag 100. The tag 100 includes a first portion 110 and a second portion 120 located on a different plane than the first portion 110.

Figure 2:
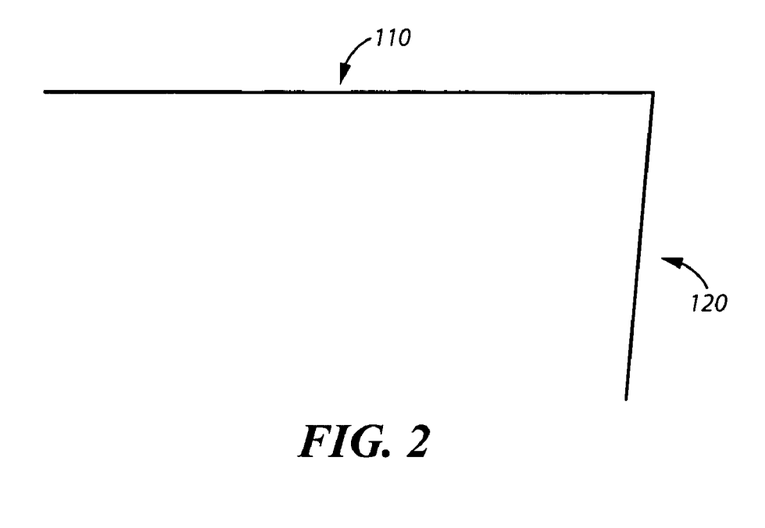
FIG. 2 is a side view of the multi-planar RFID tag shown in FIG. 1.

As shown in FIG. 2, the second portion 120 is oriented in an approximately 90° angle from the first portion 110. However, it is to be understood that the orientation angle of the second portion 120 to the first portion 110 is not limited to a substantially 90° angle.

Figure 3:
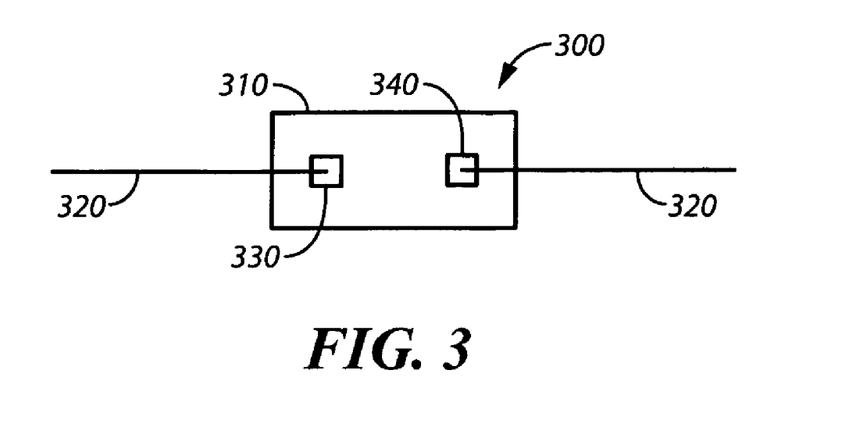
FIG. 3 is a plan of a dipole antenna useful in one embodiment of the present invention.
Figure 4:
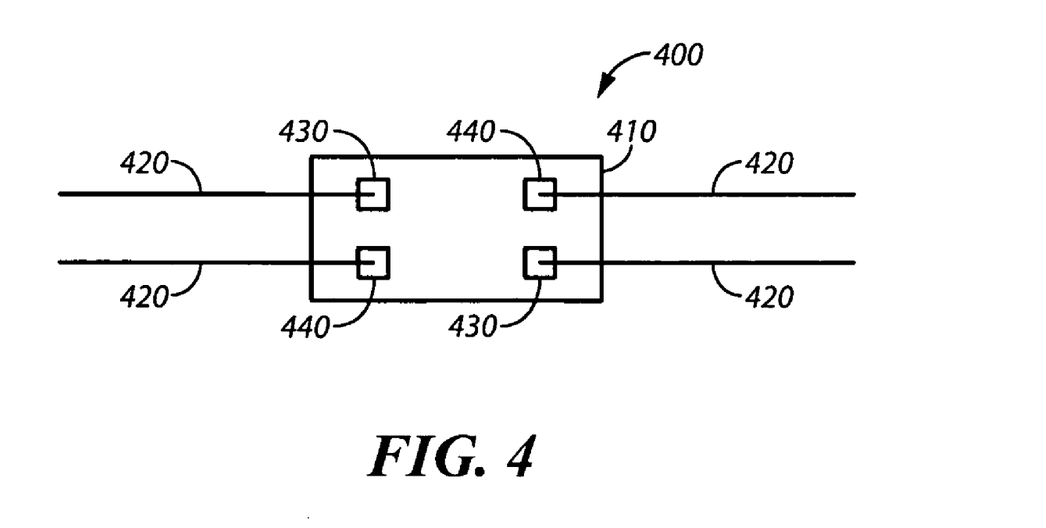
FIG. 4 is a plan of a double dipole antenna useful in another embodiment of the present invention

FIGS. 3 and 4 depict a dipole and a double dipole antenna, respectively. As shown in FIG. 3, the tag 300 includes a chip 310 having two antenna 320 connected to the chip 310. One of the connections forms the active dipole 330 and the other connection forms the reflective dipole 340. In FIG. 4, the tag 400 includes a chip 410 having two sets of antenna 420 connected to the chip 410. By arranging the connections, the two active dipoles 430 and the two reflective dipoles 440 may be on opposite sides of the chip 410.

The present invention is also directed to an object having a multi-planar RFID tag. The object may be any object capable of having an RFID tag attached within or onto the object. In select embodiments of the present invention, the object is a crate or container and in other embodiments, the object is a pallet. In those embodiments where the object is a container or crate, shape of the crate or container will generally be rectangular or square. However, it is contemplated that the container may also be other geometric shapes, including, but not limited to, cylindrical, oval, hexagonal, or triangular.

Figure 5:
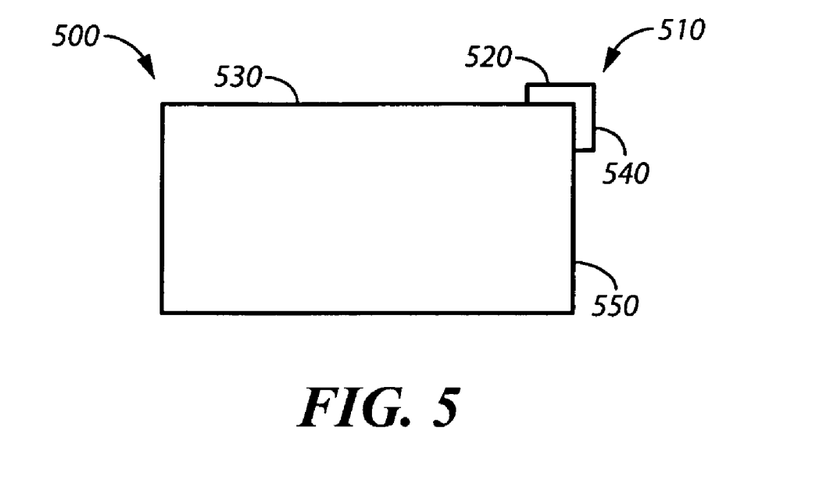
FIG. 5 is a side view of a rectangular container having a multi-planar RFID tag according to another embodiment of the present invention.
Figure 6:
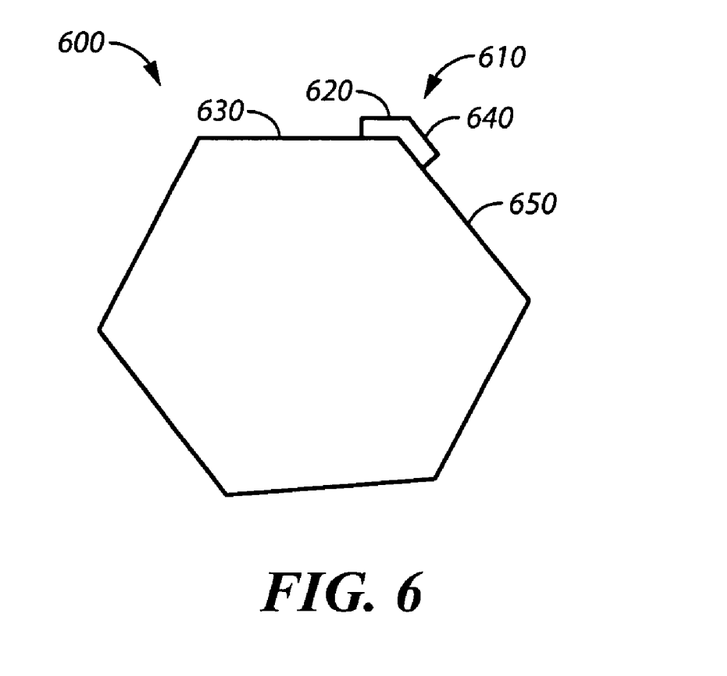
FIG. 6 is a side view of a hexagonal container having a multi-planar RFID tag according to another embodiment of the present invention.

When the RFID tag is attached within or onto the object, the tag is attached such that the tag occupies more than one plane of the object. For example, as shown in FIG. 5, if the object was a square or rectangular shipping crate 500, the tag 510 would be attached such that one portion 520 of the tag would contact one side 530, such as the top, and the other portion 540 would contact an adjacent side 550, thereby resulting in an orientation angle of 90°. However, as shown in FIG. 6, if the object 600 had a hexagonal shape, the tag 610 would be attached such that one portion 620 of the tag would contact one side 630 and the other portion 640 would contact an adjacent side 650, thereby resulting in an orientation angle of 120°. If the object were circular or oval, there would be no specific fold or crease in the RFID tag, but the tag would still occupy more than one plane and, therefore would have increased read and/or write performance when attached to the object.

Figure 7:
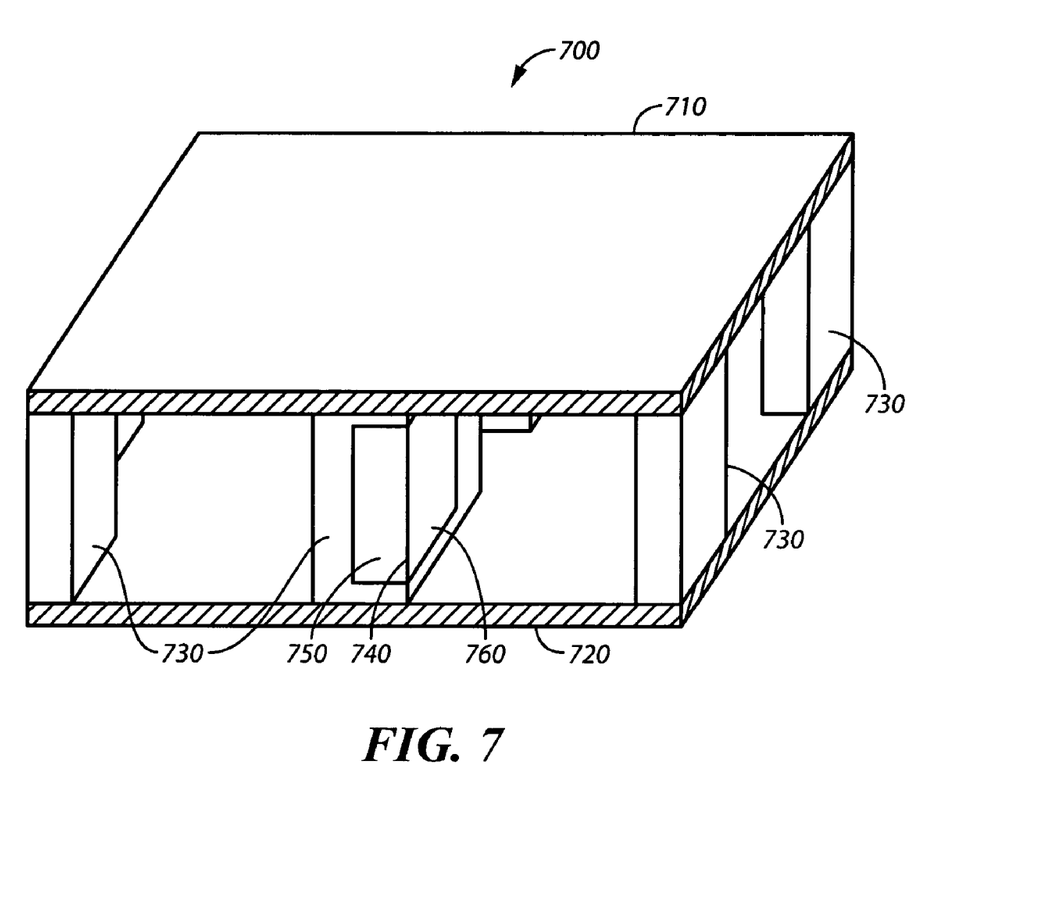
FIG. 7 is a perspective view of a pallet having a multi-planar RFID tag according to yet another embodiment of the present invention.

FIG. 7 shows the multi-planar RFID tag of the present invention attached to a shipping pallet. The pallet 700 includes a top 710 and bottom 720, as well as a plurality of supports 730. The multi-planar RFID tag 740 is attached to one of the supports such that a first portion of the tag 750 is located on one side of the support and the second portion 760 is located on another side of the support.

The tag may be attached to either the exterior of the object or the interior, or the tag may be imbedded in at least one wall of the object wherein the tag is embedded in the wall of the object by overmolding or insert molding the tag into the wall. The tag may be attached using any known attachment means, including, but not limited to, a mechanical fastening means, such as a screw, nail, staple, or combination thereof, or a chemical fastening means, such as a glue or a hot-melt adhesive, or a combination of a mechanical fastening means and a chemical fastening means.

Once a multi-planar RFID tag has been attached to an object, the present invention also includes a method of tracking the object using the multi-planar RFID tag. Objects to be tracked between locations are outfitted with the multi-planar RFID tags having information relating to the identity of the objects. The information may include, but is not limited to, one or more of the following: the type and/or quantity of goods, serial numbers, load numbers, pallet numbers, dates and/or times of pick-up and/or delivery, pick-up and/or delivery locations, and any special transport requirements, such as temperature.

The method also includes the use of RFID readers or interrogators. The RFID interrogator may be of any type suitable for receiving the signals. It may be an RF receiver; it may also include a transmitter for providing interrogation signals to passive RFID tags. The interrogator may further be capable of transmitting information to be stored in an RFID tag. Thus, the interrogator may provide updated information about the movement history of the object. The method may also include a transport vehicle that has been equipped to interrogate RFID tags. If a transport vehicle is used that is capable of interrogating RFID tags, then the method of tracking provides additional information as to the location of any particular object at any particular time.

Accordingly, in the method of the present invention, the object or objects to be tracked have a multi-planar RFID tag attached thereto, either on the exterior, on the interior, or by imbedding the tag within the walls of the object, wherein the tag is oriented such that the tag occupies more than one plane of the object or objects to be tracked. The tag is then tracked using a series of interrogator units positioned at various locations throughout the transport operation. When a tag is within the range of a particular interrogation unit, the interrogation unit determines the presence of the tag, determines an identification of the tag, and, based on the processing station at which the particular interrogation unit is associated, causes particular process steps related to item location to be noted, for example, completion of a receiving, assembly, shipping, purchase, or sale transaction involving the item. These process steps may be then be sent to a data storage site. The data storage site may then record the data either manually or by using a central processing unit or computer. The computer may then be configured to send information regarding the location of each tag on a consistent basis as the tag is moved. Alternatively, the computer may operate such that the data regarding a particular tag may be retrieved only when requested. Or the computer may be configured in any manner beneficial to tracking objects.

By using the multi-planar tags, the method of tracking objects of the present invention is more accurate and reliable as fewer data signals are lost, thereby ensuring that the exact location of an object is more likely to be ascertained at any given point in the transport of the object.

Additionally, the method of the present invention may be accomplished by using a plurality of RFID tags. In this embodiment, the tags may be multi-planar or they may be flat RFID tags that occupy only one plane. By using two or more flat tags and attaching them to different locations of the object, the two or more tags may be oriented in different planes, thereby resulting in increased accuracy of data recovery, which makes the method of tracking and transporting inventory more efficient.

Although the illustrative embodiments of the present disclosure have been described herein with reference to the accompanying drawings and embodiments, it is to be understood that the disclosure is not limited to those precise embodiments, and various other changes and modifications may be affected therein by one skilled in the art without departing from the scope of spirit of the disclosure. All such changes and modifications are intended to be included within the scope of the disclosure as defined by the appended claims.

What is claimed is:

1. A multi-planar radio frequency identification tag comprising:
   an antenna;
   a substrate having a first portion and a second portion that intersect and respectively occupy a first plane and a second plane, the first portion and the second portion of said substrate carrying said antenna; and
   at least one of an RF circuit, a logic circuit, and data store enclosed within the substrate.

2. The tag of claim 1, wherein the substrate comprises at least one of paper, cardboard, ethylene acetate, polystyrene, polycarbonate, polypropylene, polyethylene, polyurethane, polyester, polyolefin, polyamide, vinyl, silicones, rubber based adhesives, acrylic adhesive, water soluble adhesives, polyethylene terephthalate, polyethylene naphthalate, polyetherimide, polyetheretherketone, polysulfone, polyphenylene sulfone, polyethersulphone, polyvinyl chloride, polyester, and polyimide.

3. The tag of claim 1, wherein the substrate comprises at least one of polypropylene and polyester.

4. The tag of claim 1, wherein the antenna comprises at least one of a leadframe antenna, a dipole antenna and a double dipole antenna.

5. The tag of claim 1, wherein the tag has a thickness of from about 0.1 mm to about 2.0 mm.

6. The tag of claim 5, wherein the tag has a thickness of from about 0.3 mm to about 1.2 mm.

7. The tag of claim 1, wherein the data store is about 5 mm to about 10 mm away from where the first portion and the second portion of said substrate intersect.

8. The item of claim 1, wherein the tag is at least partially embedded in the object.

9. An item capable of being tracked comprising:
an object; and
a multi-planar radio frequency identification tag carried by the object;
wherein the multi-planar radio frequency identification tag comprises:
an antenna;
a substrate having a first portion and a second portion that intersect and respectively occupy a first plane and a second plane, the first portion and the second portion of said substrate carrying said antenna; and
at least one of an RF circuit, a logic circuit, and a data store enclosed within the substrate.

10. The item of claim 9, wherein the object comprises at least one of a crate, a container and a pallet.

11. The item of claim 9, wherein the tag is carried by an interior section of the object.

12. The item of claim 9, wherein the tag is carried by an exterior section of the object.

13. The item of claim 9, wherein the tag is embedded in at least one wall of the object.

14. The item of claim 9, wherein the tag is attached to the object using an attachment means comprising at least one of a screw, nail, staple, glue, and hot-melt adhesive.

15. The item of claim 9, wherein the substrate comprises at least one of paper, cardboard, ethylene acetate, polystyrene, polycarbonate, polypropylene, polyethylene, polyurethane, polyester, polyolefin, polyamide, vinyl, silicones, rubber based adhesives, acrylic adhesive, water soluble adhesives, polyethylene terephthalete, polyethylene naphthalate, polyetherimide, polyetheretherketone, polysulfone, polyphenylene sulfone, polyethersulphone, polyvinyl chloride, polyester, and polyimide.

16. The item of claim 9, wherein the substrate comprises at least one of polypropylene and polyester.

17. The item of claim 9, wherein the antenna comprises at least one of a leadframe antenna, a dipole antenna and a double dipole antenna.

18. The item of claim 9, wherein the tag has a thickness of from about 0.1 mm to about 2.0 mm.

19. The item of claim 18, wherein the tag has a thickness of from about 0.3 mm to about 1.2 mm.

20. The item claim 9, wherein the data store is about 5 mm to about 10 mm away from where the first portion and the second portion of said substrate intersect.

21. A method for tracking an object comprising:
attaching at least one radio frequency identification tag to the object, the tag comprising a homogenous substrate enclosing an antenna and at least one radio frequency identification component, and the substrate being bent to form a first portion of the tag that occupies a first plane and a second portion of the tag that occupies a second plane;
using a first radio frequency identification interrogator located in a first location to scan the tag attached to the object and transmit data regarding the object to a data storage site;
using a second radio frequency identification interrogator located in a second location to scan the tag attached to the object and transmit data regarding the object to the data storage site; and
tracking the object using the data scanned byte first radio frequency identification interrogator and the second radio frequency identification interrogator.

22. The method of claim 21, further comprising at least one additional radio frequency identification interrogator located in at least one additional location to further scan the tag and transmit data regarding the object to the data storage site and to further track the object using the data scanned by the at least one additional radio frequency identification interrogator.

23. The method of claim 21, wherein the at least one radio frequency identification tag component comprises at least one of an RF circuit, a logic circuit, and a data store enclosed within the substrate.

24. The method of claim 21, wherein the at least one radio frequency identification tag comprises at least two radio frequency identification tags;
wherein the at least two radio frequency identification tags are attached to the object at different locations such that the at least two radio frequency identification tags are oriented on different planes of the object.

* * * * *

UNITED STATES PATENT AND TRADEMARK OFFICE
CERTIFICATE OF CORRECTION

| | |
|---|---|
| PATENT NO. | : 7,271,726 B2 |
| APPLICATION NO. | : 10/701745 |
| DATED | : August 18, 2007 |
| INVENTOR(S) | : Hollon |

It is certified that error appears in the above-identified patent and that said Letters Patent is hereby corrected as shown below:

Column 4, Line 21        Delete: "the will"
                         Insert: --the present invention will--

Column 12, Line 29       Delete: "byte"
                         Insert: --by the--

Signed and Sealed this

Twelfth Day of August, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,271,726 B2 | Page 1 of 1 |
| APPLICATION NO. | : 10/701745 | |
| DATED | : September 18, 2007 | |
| INVENTOR(S) | : Hollon | |

It is certified that error appears in the above-identified patent and that said Letters Patent is hereby corrected as shown below:

Column 4, Line 21      Delete: "the will"
                                   Insert: --the present invention will--

Column 12, Line 29      Delete: "byte"
                                   Insert: --by the--

This certificate supersedes the Certificate of Correction issued August 12, 2008.

Signed and Sealed this

Sixteenth Day of September, 2008

JON W. DUDAS
*Director of the United States Patent and Trademark Office*